United States Patent Office 3,406,076
Patented Oct. 15, 1968

3,406,076
PROCESS FOR MAKING CHEESE BY COAGULATING MILK AT A LOW TEMPERATURE
Lawrence L. Little, Creve Coeur, Mo., assignor to The Battelle Development Corporation, Columbus, Ohio, a corporation of Delaware
No Drawing. Continuation-in-part of application Ser. No. 487,601, Sept. 15, 1965. This application July 19, 1966, Ser. No. 566,198
12 Claims. (Cl. 99—116)

This is a continuation-in-part to my patent application Ser. No. 487,601, filed Sept. 15, 1965, and entitled, "Cheese Curd."

This invention relates to improvement in the manufacture of cheese curd and relates particularly to a new and novel method for making cottage cheese.

In the manufacture of cheese curd, it is conventional practice to inoculate milk with a bacteria culture which produces lactic acid to acidify the milk. When such milk reaches an acidity at or near its isoelectric point, agglomeration of the casein occurs to form a curd and effect a separation of the whey. Although when properly regulated and controlled "cultured" cheese curd, such as is produced in the manufacture of cottage cheese, is of high quality, the difficulties and disadvantages encountered through the utilization of such a system are many.

For example, in the conventional process for making cottage cheese, the milk is usually held at temperatures and for times which tend to promote deleterious growth. Milk is usually "set" at temperatures of 70–75° F. for periods of 12 to 18 hours or alternatively may be held at about 90° F. for as long as 4 hours. During such setting period and in subsequent cooking before the whey reaches a temperature disposed to stop bacterial growth, a substantial multiplication of contaminating bacteria that have survived pasteurization may occur. Such contaminating bacterial growth contribute to the presence of spoilage organisms that bring about the notoriously short life of cottage cheese.

For instance, in the production of cottage cheese, undesirable bacteria species which often survive pasteurization interfere with the culture process and impart poor keeping qualities to the finished cheese. Also, the problems of phage have become so widespread and difficult to control that developing acidity by culturing is becoming increasingly hazardous and difficult. The word "phage" is applied to viruses which attack and destroy bacteria. These viruses often infect cottage cheese bacterial starter cultures and destroy the desirable acid and flavor producing bacteria. There are very few cottage cheese processors that do not have to dispose of several batches of milk each year because of phage. Such a loss not only involves a loss of material and labor but also interrupts the manufacturer's ability to continuously supply his customers.

Additionally, it is difficult to accurately develop the desired acidity by the culturing process. To obtain the desired optimum quality of cottage cheese curd, it is very important to maintain exact control over the hydrogen potential of the milk at the time the curd is being cooked. The desired acidity, as measured by pH for cutting and cooking is within the range of 4.60 to 4.80. Since the lactic acid producing organisms are in a logarithmic phase of their growth at the time the milk reaches this pH, they are producing acid very rapidly; consequently, the cheesemaker must keep a close watch in order to cut the curd while it is within a critical pH range. The lactic acid producing organisms continue to grow and produce acid after the curd is cut so that if the curd is cut at a pH of about 4.8, the acidity is 4.6 or lower by the time cooking effects a temperature where lactic acid production stops. Consequently, the time for cutting and cooking must be expertly gaged to avoid overacidity of the cooked product which results in excessive shattering of the cubes giving an unsightly appearance accompanied by loss of curd and low yield. A slight miscalculation in the time for cutting and cooking contributes to a hard rubbery and dry product (too acid) or a soft fragile mushy product (high pH).

An obvious expedient in circumventing the difficulties encountered by the utilization of bacteria cultures in the manufacture of cheese curd is the direct addition of acid to milk in quantities needed to effect the desired acidity for casein coagulation. However, cheese curd, such as cottage cheese curd, to be marketable must be of a gelled texture that is obtained only by the relatively slow and uniform coagulation which occurs at an acidity which is at or near the isoelectric point of the milk. When concentrated acids are added directly to milk to increase its acidity, the localized area of the milk where the acid is introduced acquires an excessive acidity before a homogenous mixture of milk and acid can be obtained. Premature casein agglomeration occurs in the localized areas and uneven precipitation occurs generally. The texture of the resultant loose precipitant is unsatisfactory usually being hard, dry and uneven in size as well as being generally unpalatable.

Casein agglomeration in milk effected by the slow addition of concentrated acids accompanied by agitation to avoid premature precipitation requires prohibitive time and is difficult to control. Agglomeration of casein effected by the addition of acid of a dilution to avoid premature casein precipitation results in a thin, watery and undesirable product.

It is known that when concentrated acid is added to refrigerated milk the casein does not readily agglomerate. Culture acidification of milk is generally at 70° F. or higher since casein does not readily coagulate at lower temperatures. This property of milk is exploited commercially by processes such as that taught by United States Patent 3,089,776, to Carl Ernstrom.

In the Ernstrom process, milk (usually skim milk) is pasteurized and cooled to a temperature of about 40° F. Concentrated hydrochloric acid is then added to bring the pH down to about 4.60. The milk does not coagulate due to the low temperature. The refrigerated acid-milk solution is agitated or stirred to effect a uniform mixture and is then warmed in a quiescent state to a temperature of about 75° F. Agitation of the milk during warming is avoided. After the milk is warmed an agglomeration of the casein takes places, the curd is cut and cooked in the usual manner. The curd thus obtained is of high quality; however, the step of warming the milk in a quiescent state is difficult. Presently available apparatus for processing dairy products include heat exchangers and large storage vats so that refrigerating the milk while introducing it into a storage vat for acidification does not constitute a problem. However, heating reasonably large quantities of milk in a quiescent state for the commercial application of the Ernstrom process is not practical in conventional storage vats. External heating elements or heating elements inserted into the milk are prohibitively slow under such circumstances. It is not possible to use commercial heat exchangers wherein the milk is caused to flow over hot heat exchanger plates since the acidified milk must be heated in a quiescent state.

Effective commercial utilization of the Ernstrom system requires special automated apparatus wherein refrigerated acidified milk is caused to rise slowly in vertically positioned tubes that are surrounded with circulating heated water disposed to cause the temperature of the milk in the tubes to rise uniformly and the casein to coagulate. The curd is cut as it extends from the top of the tubes. Such automated equipment is expensive and renders much of the conventional equipment obsolete.

Additionally, to get curd of sufficient body to stand up in the vertical tubes, it is necessary to substantially increase the milk solids not fat content of the milk by the addition of skim milk powder or concentrated skim milk. Such additions materially increase the raw material costs.

I have discovered a direct acid process wherein a curd of excellent texture is obtained at refrigerated temperatures without the necessity of warming the milk. Generally my invention consists of discovery that a high-quality cheese curd is obtained from milk by introducing acid and proteolytic enzymes into refrigerated milk in quantities disposed to effect casein coagulation. I have had particular success by utilizing the proteolytic enzyme renin in what is generally regarded as excessive quantities.

My method is particularly advantageous in that acidified milk may be converted directly into high quality marketable curd without the necessity of warming the milk in a quiescent state. In contrast to the culturing process wherein the curd must be cut immediately upon acidification, in my process cutting may be delayed for many hours after coagulation is completed. Cottage cheese made by my process is much easier to cook, and the finished cheese is much more uniform than the cultured product. Interfering and undesirable organisms that frequently adversely affect the quality of the cultured product are not a problem when the present process is utilized. By my method the coagulation characteristics of the curd can be precisely controlled.

It is, therefore, the object of my invention to provide a method for making cheese curd from milk wherein casein coagulation is effected at refrigerated temperatures.

It is also an object of the present invention to provide a method for making a superior textured cheese curd by adding acidifying agents and proteolytic enzymes to refrigerated milk in amounts to cause casein coagulation.

It is a further object of the present invention to provide a method for making a uniform high textured cheese curd by mixing concentrated acid with refrigerated milk until the acidity proteolytic enzyme in amounts to cause casein coagulation.

A still further object of the present invention is to provide a method for making cottage cheese wherein a low fat milk is refrigerated at temperatures of about 55° F. or below, acidified with an edible acid and coagulated by the addition of rennet.

Many objectionable features of both the culture process and the known direct acid process are eliminated by the method of the present invention.

In the present process, milk is first refrigerated. The maximum operable temperature would include the highest temperature at which the milk could be acidified without coagulation. Such a maximum usable temperature varies from batch to batch depending on the composition of the milk and particularly on milk solids. For example, for cottage cheese made from skim milk which contains about 8 to 9 percent milk solids, not fat, the maximum temperature is about 55° F. Fortifying the milk with additional milk solids not fat raises the maximum temperature at which the milk can be acidified without coagulation. At a milk solids not fat concentrtions of 16 to 20 percent by weight, the maximum temperature may be as high as 60° F. Generally, the preferred maximum temperature is about 55° F.

It is, of course, undesirable to freeze milk so that the minimum useful temperature is just above the freezing point of milk. The freezing point of milk varies to some extent within the range of 30 to 32° F. but generally it may be regarded as being about 31° F.

Once the milk has reached the necessary refrigeration temperature, it is "set" with the acid and enzyme additions. Such setting constitutes putting the milk in a condition wherein casein coagulation occurs. In the present instance, the time of setting may be accurately controlled since the time required for complete casein coagulation is dependent to a large degree on such controllable parameters as acidity, the quantity of enzyme additon, the temperature of the milk, and the milk solids not fat content of the milk. Ordinarily, the acid addition will be made first, however, coagulation will not occur at the refrigerated temepratures to any appreciable extent until both additions have been made so that both additions may be made simultaneously or part or all of the enzyme addition may be made first.

The milk is preferably vigorously stirred or agitated during and after the acid and enzyme additions to obtain a uniform mixture prior to casein agglomeration. The additions are preferably made in such quantities to effect substantially complete coagulation within about 4 hours; however, the additions may be such as to effect a delayed coagulation over a period of 24 hours or longer since at the refrigerated temperatures, undesirable bacterial growth is not a problem.

Any material that is capable of acidifying milk to the desired pH and which does not render the curd deleterious for human consumption may be employed as the acid addition. In addition to lactic acid, readily usable acids include hydrochloric acid, phosphoric acid, pyrophosphoric acid, citric acid, tartaric acid, fumaric acid, maleic acid, adipic acid, succinic acid, and acetic acid. Many of the aforementioned acids are available commerically in specific food grades that are ideal for the present process. Such acids or acidifying materials should be employed in a relatively concentrated form and preferably should be of such concentration as to acidify the milk to prevent a thin, watery product. Preferably the acid addition will be of such a concentration as to not exceed about 5 percent of the weight of the milk. For the purpose of the present specification and claims, the meaning of the word "acid" and the term "edible acid" shall include materials that are capable of acidifying milk without undue dilution. For example, acidogens, such as D-glucono-delta-lactone, can be employed as the acid addition.

In employing the present method, the milk is brought to temperature, i.e., preferably about 40° F., and the desired amount of acid may be added. Sufficient enzyme or rennet is added to bring about coagulation within the desired time. When the coagulation is firm enough to cut, it can be determined easily by visual observation so that virtually all of the art and skill necessary for effecting the culture process is eliminated in cutting and cooking the cheese.

In the manufacture of cottage cheese by the conventional culture process or the known direct acid process, small additions of proteolytic enzymes, and in particular rennin in the form of rennet extract, are frequently made to alter or enhance casein coagulation. However, these additions are not made in amounts which would cause casein coagulation at refrigerated temperatures. In the present process, the milk is acidified and one or more proteolytic enzyme is added in sufficient quantity to effect casin coagulation at the refrigerated temperature.

When a slight excess of rennet is used in the culturing method, the finished cottage cheese is soft and lacks the characteristic firm texture that is desired. When a significant excess of rennet is used in the range of 1½ to 2 ccs. (Hansen's standard) per 1000 pounds of milk, the milk coagulates at an abnormally high pH and the curd is so sticky and rubbery and mats so badly it cannot be cooked. Adding excessive amounts of rennet in my process also produces a soft curd, however, considerably greater quantities per 1000 pounds of milk can be utilized before this characteristic becomes objectionable. For example, in the manufacture of large curd cottage cheese we have found the practical and preferred range of rennet addition for obtaining a commercially attractive cottage cheese product to be from about 10 to 60 cc. per 1000 pounds of milk (Hansen's standard). Adding greater than 60 cc. of rennet produces a curd that is softer than is desirable for cottage cheese, though perfectly acceptable and some-times desirable for other cheese curd products. The use of less than 10 cc. of rennet (per 1000 pounds of milk) generally entails an excessive delay in obtaining a coagulum. In the manufacture of cheese curd where a soft curd is desired or may be tolerated, up to 100 cc. of such rennet can be employed in conjunction with my process. Though soft, the cheese curd does not mat during cooking providing the pH is about 4.95 or lower. This feature of my process makes the process readily adaptable to making other varieties of soft, unripened cheese, such as bakers' cheese, cream cheese, and Neufchatel cheese. Since these cheeses are essentially a soft, fine-textured curd, excessive amounts of rennet assure such characteristic.

The preferred quantity of enzyme employed varies widely and is dependent on the time requirements as well as the degree of acidity, refrigeration temperature employed, and cheese curd product being made. I have found that when the pH of the milk is adjusted to the range of about 4.50 to 4.80 and the milk is set at refrigeration temperatures, it is difficult to add too much rennet providing the desired product is not large curd cottage cheese. Under these conditions, increasing the amount of rennet hastens the time of coagulation but does not alter the type of coagulation or its cooking characteristics. This discovery is significant since in the culturing process the customary 1 ml. of rennet (Hansen's standard) per 1000 pounds of milk is sufficient to bring about coagulation almost instantly when the milk is in the temperature range of 70 to 90° F. and a pH range of 4.6 to 4.8. However, 4 to 18 hours of setting time is required by the culturing process for acid development to reach a pH of 4.95 or below. By the present process, the pH may be brought to the desired level in little or no time and the setting time can be controlled by the amount of rennet used so as to obtain setting times varying from 30 minutes to 24 hours. Where the desired acidity is within the 4.50 to 4.95 pH range, it is generally preferable to employ at least 10 ml. of rennet (or other proteolytic enzyme) per 1000 pounds of milk to avoid excessive setting times, although it may be possible to use as little as 1.5 ml. of rennet for such purpose. As stated above, as much as 100 cc. of rennet per 1000 pounds of the refrigerated milk-acid mixture can be employed to obtain rapid coagulation without adverse effects depending on the product being made.

Although the usual acidity consisting of the pH range of from about 4.60 to 4.80 conventionally employed in the manufacture of ordinary (large curd) cottage cheese is applicable to the present process, in some instances it is preferred to employ slightly greater acidity. Consequently, the preferred pH range of acidity for making large curd cottage cheese with the present process is from about 4.5 to 4.8.

An advantage of the present process is that the balance between acid coagulation and rennet coagulation characteristics of the curd can be precisely controlled. If small curd-type cottage cheese is desired by utilizing the culturing process, acid coagulation is paramount and little or no coagulator or enzyme is used. This same characteristic can be obtained in my process by acidifying to a lower pH in the range of 4.20 to 4.50. Then, even when a great excess of rennet is used to coagulate the milk, the finished cottage cheese has the characteristic of that made by acid coagulation with little or no rennet. By this process the pH to which the milk is acidified determines the characteristic of the curd and this can be controlled precisely. Then the amount of rennet used can be within the range of from 0.5 to 1 cc. per 1000 pounds of milk which is substantially the amount normally used in the culturing process. As stated above, amounts up to 100 cc. per 1000 pounds of milk is usable to produce satisfactory cheese products.

Thus, it may be seen that in the manufacture of cheese curd generally wherein refrigerated milk is acidified to a pH of from about 4.00 to 4.95, proteolytic enzymes are preferably added in amounts equivalent to from about ½ to 100 cc. of the commercially available Hansen's single strength liquid rennet per 1000 pounds of milk. Where small curd cottage cheese is desired the milk is acidified to a pH of about 4.20 to 4.50 and the enzyme addition ranges from about ½ to 100 cc. per 1000 pounds of milk (equivalent to Hansen's rennet solution).

An advantageous feature of my invention, particularly as it relates to the production of cottage cheese, is that it is not necessary to supplement the milk solids not fat content of the milk by the addition of skim milk powder or concentrated skim milk. However, my process is amenable to such additions if so desired. In the production of cottages cheese by my method, either fresh skim milk, fresh skim milk fortified to any milk solids content (up to 20 percent, by weight) with skim milk powder, condensed skim milk, reconstituted skim milk powder, or condensed skim milk to any solids not fat content from about 8.0 to about 20.0 percent, by weight of the milk may be employed.

The enzymes that are useful when employed in conjunction with the process of the present invention are the proteolytic enzymes such as rennin, pepsin, papain, and ficin. The preferred and most frequently employed enzyme is rennin. Rennin is commercially available in the form of a rennet extract obtained from calves stomachs. Such rennet extract is available in either powder or solution form either of which may be conveniently utilized for the process of the present invention. Rennet extract consists essentially of rennin; however, small amounts of other enzymes such as pepsin may be present. Standardization of commercial rennet is extremely difficult and is accomplished only by standard measurements of enzyme activity. Thus, commercially available rennet powder may contain varying amounts of extract but will possess substantially uniform activity in effecting casein coagulation. For example, commercially available Hansen's Rennet Powder (manufactured by Chr. Hansen's Laboratory, Inc., Milwaukee, Wis.) is standardized to approximate the coagulation ability set by the American Pharmaceutical Association, Washington, D.C. A method of standardization with the standards provided by this organization is described in the publication "The National Formulatory," Tenth Edition, National Formulary X prepared by the Committee on National Formulary Under the American Pharmaceutical Association; published in 1955 by the American Pharmaceutical Association (see particularly pages 491, 709, and 710). N.F. Reference Standards may be obtained from the Chairman of the Committee on National Formulary, American Pharmaceutical Association, 2215 Constitution Ave. NW., Washington, D.C. 20037. Commercially available single strength rennet possesses a coagulating activity of not less than 90 percent and not more than 110 percent of the reference rennin. The reference rennin is a carefully preserved, stable, powdered rennin that has been repeatedly tested for a number of years so that its stability and its standard are definitely established. It is used as a reference standard in the rennin assay on the basis of coagulating approximately, but not less than, 25,000 times its own weight in fresh cow's milk.

Rennet is also available commercially in liquid form. For example, Hansen's liquid rennet is available in varying strengths identified as single strength, double and triple strength solutions. One gram of Hansen's Standard (NF powdered rennet) is equivalent in milk coagulation strength to about 3.75 cc. of Hansen's single strength liquid rennet.

A common form of commercialy available rennin used in the manufacture of cottage cheese is known as cottage cheese coagulator. Cottage cheese coagulator is a dilute solution of enzymes prepared by diluting approximately 1 part rennin and/or pepsin with 25 to 30 parts of water, propylene glycol, salts, and bacteriostatic agents which aid in the preservation of the enzymes. Cottage cheese coagulators are about 1/25 to 1/30 the strength of Hansen's single strength rennet. The extremely small amounts of enzymes conventionally used in cottage cheese manufacture make the more dilute cottage cheese coagulators more convenient to use because they can be measured with greater accuracy. Such cottage cheese coagulators may be employed in conjunction with the present process particularly as it relates to the manufacture of small curd cottage cheese; however, where large additions of enzymes are to be made, a more concentrated solution will be desirable.

Since the strength of all commercially available proteolytic enzymes are best measured in casein coagulation under standardized conditions, such enzymes will be added in amounts which correspond in casein coagulation to the well-known commercial single strength Hansen's liquid rennet.

The following specific examples of my invention illustrate its utility and novelty but in no way limit the claims to the exact embodiments set forth.

Example 1, three batches of pasteurized skim milk were cooled to a temperature of about 40° F. and acidified to a pH of about 4.7 with concentrated hydrochloric acid. While maintaining the 40° F. temperature, the curd was coagulated by adding 30 ml. of Hansen's single strength liquid rennet per 100 gallons of milk. The milk was coagulated and firm enough to cut in one hour. One lot was cut at the end of the hour and cooked. The second lot was held at the 40° F. temperature for 12 hours after it had coagulated firm enough to cut before it was actually cut. The third lot was held 48 hours at the refrigerated temperature before it was cut and cooked. All three batches cooked out very nicely and made excellent quality cottage cheese. There was no indication of bacterial growth or deterioration of quality due to the prolonged delay in cutting and cooking.

Example 2, fresh, raw skim milk containing 9.0 percent milk solids not fat was pasteurized by heating to 143° F. for 30 minutes. The milk was then cooled to 38–42° F. For each 100 gallons of milk, 20 cc. of Hansen's rennet and approximately 212 fluid ounces of dilute HCl (33 percent 20° Bé. HCl and 67 percent water by volume) was added. The acid addition was sufficient to reduce the pH of the milk to 4.60. The milk was agitated vigorously while the rennet and acid solutions were being added, and agitation was continued for about 10 minutes thereafter. The rennet-milk-acid mixture was then allowed to remain in a quiescent state until a firm coagulum was formed. This required approximately 4 hours.

After the firm coagulum was formed, the curd was cut into ¼-inch cubes. From this point, the process followed the conventional cottage cheese making operation. This procedure is substantially as follows:

The curd is allowed to remain undisturbed for about 15 minutes after it is cut. Heat is applied to the jacket of the cottage cheese vat to slowly raise the temperature. When the whey at the sides of the vat reaches a temperature of 90° F., the curd is moved very slowly. The agitation is increased as the temperature rises. The milk is heated to a temperature of about 115 to 135° F. within a period of about 1 to 2 hours. The curd is tested periodically for firmness as the cooking progresses to determine the cooking temperature and time. By my method, the curd is tested on the initial batch. On subsequent batches, the same cooking temperature and time are followed, eliminating the need for periodical testing of the curd for firmness, as is required for the culturing method.

More concentrated HCl may be used to lower the pH even the conventional 22° Bé., 38 percent HCl. However, the more concentrated forms give off very irritating and obnoxious fumes. The dilution described above is virtually free of fumes.

After cooking the whey is drained from the curd and replaced with about ⅓ of its volume with rinse water at a temperature of 90 to 95° F. The water and curd are stirred and then the water is drained from the curd. A second rinse water is added to the curd at a temperature of 60 to 65° F. This mixture is agitated, the water is drained off, and a third rinse water is added at a temperature of 45 to 50° F. The third rinse water and curd are agitated and then drained as before. After the curd is drained of the third rinse water, the curd is then ready for creaming and packaging according to standard procedures.

It is common practice to chlorinate and acidify the rinse water in order to sterilize the waters and prevent contamination of the curd. For this purpose, about 10 parts per million available chlorine is used and acid is added in amount sufficient to reduce the pH to about 6.0. The use of chlorinated, acidified rinse waters is optional with my method.

Example 3, this example consisted of the same procedures as Example 2 except 40 ml. of rennet was added so as to bring about coagulation in approximately 1 hour.

Example 4, this example consisted of the same procedures as Example 2, except 10 ml. of rennet was added so as to bring about coagulation in about 14–16 hours.

Example 5, this example consisted of the same procedures as Example 2 except the curd was not cut as soon as a firm coagulation was formed, instead the milk was allowed to remain in a quiescent state for 12–14 hours. It was then cut at the convenience of the operator, and the remainder of the process carried out in accordance with Example 2. There was no bacterial growth or any change in pH.

Example 6, this example consisted of the same procedures as Example 2, except the total solids content of the milk was increased to 12.0 percent by dispersing nonfat, dry milk solids in the milk. The amount of dilute HCl solution was increased to approximately 285 fluid ounces per 100 gallons, sufficient to reduce the pH to 4.60.

Example 7, this example consisted of the same procedures as Example 6, except that reconstituted skim milk was employed in place of skim milk. The reconstituted skim milk was made by dispersing 106 pounds of non-fat dry milk in 754 pounds of water for each 100 gallons of skim milk desired. This gave a skim milk containing 12 percent total solids.

In this example, condensed skim milk was used instead of the non-fat dry milk, but the amount of condensed skim milk and water had to be adjusted so as to give the desired 12 percent solids.

While 12 percent solids were used in this example, this can be varied from about 8 percent to a maximum of about 14 percent. However, the amount of dilute HCl solution must also be varied in direct proportion to the solids content so as to obtain a pH of 4.60.

Example 8, this example consisted of the same procedures as Example 2, except that whole milk was employed in place of the skim milk used in Example 1.

Example 9, this example consisted of the same procedures as Example 2, except that a mixture containing about equal parts of whole milk and skim milk was used in place of the skim milk in Example 1.

Example 10, this example consisted of the same procedures as Example 2, except that a mixture of milk and cream was used instead of skim milk. The proportion of milk and cream were adjusted so as to give a butterfat content of about 10 percent. The amount of dilute HCl solution was also reduced slightly so as to give a pH of approximately 4.60.

Example 11, this example consisted of the same procedures as Example 2, except that cream containing 18 to 20 percent butterfat was used instead of skim milk. Also, the cream was homogenized at a pressure of about 500 to 3,000 pounds, after pasteurization and before the milk was cooled below about 110° F. The amount of dilute HCl solution was reduced to approximately 170 fluid ounces per 100 gallons, sufficient to obtain a pH of 4.60.

Example 12, this example consisted of the same procedures as Example 2, except that about 10 grams of Hansen's rennet powder were used instead of the rennet solution.

Example 13, this example consisted of the same procedures as Example 2, except the skim milk was pasteurized at 162° F. for 30 seconds.

Example 14, this example consisted of the same procedures as Example 7, except that the milk was not pasteurized. The skim milk was refrigerated at 38–42° F.

Although my invention is particularly useful when used in the manufacture of cottage cheese, it is also applicable to the manufacture of other cheese products wherein casein is coagulated to form a high texture gelled curd. For example, baker's cheese is a soft-curd, high-acid, fine-textured cheese. It is made from skim milk which is set with starter and rennin very much like cottage cheese. However, the curd is not cut or cooked. When a firm coagulation has formed, the coagulated milk is dipped from the vat into cloth bags where it is packed in ice and allowed to drain. This type of cheese can be made very easily by my process. In this application, the milk is set at a temperature of approximately 40° F. by acidifying with an edible acid such as food grade hydrochloric acid to a pH of approximately 4.0 to 4.5 and rennin or cottage cheese coagulator is added in sufficient amount to produce a firm coagulation in the desired time. In this application, it is preferable to add a high level of rennin to form a coagulation in relatively short time and also to insure that the curd will be soft. The amount of rennin would vary from approximately 3.0 to 150 ml. per 1000 pounds of milk. After a firm coagulation is formed, the coagulated milk is dipped into cloth bags, packed in ice, and allowed to drain until the desired solids content is reached as in the conventional culturing method.

This new process is also applicable for making cream cheese. In this application, the essential difference is that cream or milk is used instead of skim milk. A product containing from 10–18 percent butterfat will yield a product with 33 percent butterfat, or more as required by the F.D.A. standards for cream cheese. The milk is acidified to pH 4.2–4.6 at 40° F. and rennin is added in sufficient amount to bring about coagulation in the desired time. When a firm coagulation is obtained, the curd is cooked, pressed in bags, or centrifuged by any of the methods presently employed in the culturing process. In this application, my process is used only to acidify and coagulate the milk, replacing the present method of culturing.

Neufchatel cheese and cheese spreads are essentially cream cheese with butterfat reduced to lower levels. In this application, the only modification that is required is to start with a lower fat content milk, usually 2–10 percent fat.

The method of the present invention is clearly applicable to obtaining a cheese curd from any milk base, particularly skim milk and reconstituted skim milk. However, the term "milk" as used in the present specification and claims is generic and includes any milk from mammals having a casein content and includes medium and high butterfat milk or cream. For example, the present method may be utilized for obtaining a cheese curd from mixtures of milk and cream containing up to 20 percent butterfat.

What is claimed is:
1. A method for making cheese curd from milk comprising:
(a) refrigerating milk to a temperature above freezing to about 60° F. wherein coagulation will not occur within a pH range of from about 4.00 to 4.95; and
(b) setting said milk while it is at said temperature by acidifying to a pH from 4.00 to 4.95 and adding proteolytic enzymes in amounts to effect casein coagulation while maintaining said milk at temperatures above freezing to about 60° F.

2. The method as set forth by claim 1 wherein said refrigeration temperature is within the range of from the freezing temperature of said milk to about 55° F.

3. The method as set forth by claim 1 wherein the milk solids not fat concentration of said milk is within the range of 16 to 20 percent, by weight, and said refrigeration temperature is within the range of from the freezing temperature of said milk to about 60° F.

4. The method as set forth by claim 1 wherein said proteolytic enzyme is at least one enzyme selected from the group consisting of rennin, pepsin, papain, and ficin.

5. The method as set forth by claim 1 wherein said proteolytic enzymes are added in quantities equivalent in casein coagulation activity to from ½ cc. to 100 cc. per 1000 pounds of milk of Hansen's single strength rennet.

6. The method as set forth by claim 1 wherein said pH range in subsections (a) and (b) are 4.50 to 4.95 and said proteolytic enzymes are added in quantities equivalent in casein coagulation activity to from 1½ cc. to 100 cc. per 1000 pounds of milk of Hansen's single strength rennet.

7. The method as set forth by claim 1 wherein said pH range in subsections (a) and (b) are 4.50 to 4.80 and said proteolytic enzymes are added in quantities equivalent in casein coagulation activity to from about 10 to 60 cc. per 1000 pounds of milk of Hansen's single strength rennet so as to produce large curd cottage cheese quality coagulum.

8. The method as set forth by claim 1 wherein said pH range in subsections (a) and (b) are 4.20 to 4.50 and said proteolytic enzymes are added in quantities equivalent in casein coagulation activity of from about ½ cc. to about 100 cc. per 1000 pounds of milk of Hansen's single strength rennet so as to produce small curd cottage cheese quality coagulum.

9. The method as set forth by claim 1 wherein said milk is acidified by an acid addition which does not exceed about 5 percent of the weight of the milk.

10. The method as set forth by claim 1 wherein said pH in subsections (a) and (b) are 4.2–4.6 and said enzyme is added in quantities to effect a soft cheese curd.

11. The method as set forth by claim 1 wherein said pH in subsections (a) and (b) are 4.00 to 4.50 and said enzymes are added in quantities equivalent in casein coagulation activity of from about 3 to 150 ml. per 1000 pounds of Hansen's single strength rennet so as to effect a soft cheese and suitable for use in making baker's cheese.

12. A method for making cottage cheese comprising:
(a) refrigerating milk to a temperature of from the freezing point of said milk to about 55° F.;
(b) setting said refrigerated milk by acidifying to a pH of from about 4.50 to 4.80 and adding proteolytic enzymes in quantities equivalent in casein coagulation activity to from 10 cc. to 60 cc. of Hansen's single strength rennet per 1000 pounds of milk so as to produce a coagulum;
(c) cutting said coagulum into cubes; and
(d) cooking and washing said cubes.

References Cited
UNITED STATES PATENTS

| | | | |
|---|---|---|---|
| 2,908,575 | 10/1959 | Spiess et al. | 99—116 |
| 2,997,395 | 8/1961 | Berridge | 99—116 |
| 3,089,776 | 5/1963 | Ernstrom | 99—116 |
| 3,120,443 | 2/1964 | Berridge | 99—116 |
| 3,132,026 | 5/1964 | Radema et al. | 99—116 |
| 3,298,836 | 1/1967 | Ernstrom | 99—116 |

ALVIN E. TANENHOLTZ, *Primary Examiner.*

D. M. NAFF, *Assistant Examiner.*